US00RE41140E

(19) United States
(12) Reissued Patent
Heath

(10) Patent Number: US RE41,140 E
(45) **Date of Reissued Patent: *Feb. 23, 2010**

(54) MODULAR DECKING PLANKS

(75) Inventor: Randall Heath, Pinson, AL (US)

(73) Assignee: Homeland Vinyl Products, Inc., Pinson, AL (US)

( * ) Notice: This patent is subject to a terminal disclaimer.

(21) Appl. No.: 10/673,074

(22) Filed: Sep. 26, 2003

Related U.S. Patent Documents

Reissue of:
(64) Patent No.: 6,324,796
Issued: Dec. 4, 2001
Appl. No.: 09/546,869
Filed: Apr. 10, 2000

(51) Int. Cl.
*E04B 5/02* (2006.01)

(52) U.S. Cl. ..... 52/177; 52/483.1; 52/579
(58) Field of Classification Search ..... 52/177, 52/180, 181, 574, 579, 480, 591.4, 592.1, 52/506.1, 732.1, 483.1; 14/73; 405/218, 219
See application file for complete search history.

(56) References Cited

U.S. PATENT DOCUMENTS

| | | | | | |
|---|---|---|---|---|---|
| 3,385,182 | A | | 5/1968 | Harvey | |
| 4,266,381 | A | * | 5/1981 | Deller | 52/177 |
| 4,522,007 | A | | 6/1985 | Oehlert | |
| 5,050,362 | A | * | 9/1991 | Tal et al. | 52/588.1 |
| 5,185,193 | A | | 2/1993 | Phenicie | |
| 5,204,149 | A | | 4/1993 | Phenicie et al. | |
| 5,247,772 | A | | 9/1993 | Greenberg | |
| 5,535,567 | A | | 7/1996 | Cahoon | |
| 5,647,184 | A | | 7/1997 | Davis | |
| 5,758,467 | A | * | 6/1998 | Snear et al. | 52/592.1 |
| 5,811,035 | A | | 9/1998 | Mockry | |
| 5,816,010 | A | * | 10/1998 | Conn | 52/588.1 |
| 5,819,491 | A | * | 10/1998 | Davis | 52/592.1 |
| 6,199,240 | B1 | | 3/2001 | You | |
| 6,516,577 | B2 | | 2/2003 | Pelfrey | |
| 6,637,163 | B2 | | 10/2003 | Thibault | |
| D485,621 | S | | 1/2004 | Deel | |
| 6,729,097 | B2 | | 5/2004 | Patel et al. | |
| 6,739,106 | B2 | | 5/2004 | Curatolo | |
| D492,797 | S | | 7/2004 | Simko et al. | |
| 7,047,697 | B1 | | 5/2006 | Heath | |

* cited by examiner

*Primary Examiner*—Michael Safavi
(74) *Attorney, Agent, or Firm*—Smith, Gambrell & Russell

(57) ABSTRACT

A decking system for placement on a subassembly having at least two spaced apart joists. A plurality of elongated tubular elements for placement in lateral interlocking engagement with each other transversely of and spanning the distance between the joists. Each of said plurality of elements having a top portion, a bottom portion, and first and second side walls connecting said top and bottom portions. The top portion extends laterally beyond the first side wall and has formed thereon a downwardly extending longitudinal flange. The bottom portion extends laterally beyond the second side wall and has formed thereon an upwardly extending longitudinal wall defining an upwardly opening channel adjacent the second side wall adapted to receive therein a watertight relation the downwardly extending longitudinal flange. The bottom portion having formed therein a plurality of apertures intermediate the second side wall and the upwardly extending longitudinal wall, adapted for the insertion of fasteners therethrough for engagement with the joists.

10 Claims, 3 Drawing Sheets

MODULAR DECKING PLANKS

Matter enclosed in heavy brackets [ ] appears in the original patent but forms no part of this reissue specification; matter printed in italics indicates the additions made by reissue.

FIELD OF THE INVENTION

The present invention relates generally to construction materials and more particularly to materials used for indoor and outdoor decking. In even greater particularity the present invention relates to the use of prefabricated decking planks and in still greater particularity to decking planks made from extruded materials. The invention is applicable, for example, in the construction of boat docks, piers, decks, patios, walkways, pontoon boat floors, and the like.

BACKGROUND OF THE INVENTION

Extruded polyvinyl building and construction materials are increasing in popularity due to their light weight, which greatly simplifies shipping, handling and installation, and also due to their durability in adverse weather conditions, which greatly increases their service life. Polyvinyl materials do not need to be periodically painted or preserved, which greatly lowers maintenance costs, and modern ultraviolet inhibitors prevent UV breakdown of polyvinyl materials for many years. Extruded hollow members offer utility similar to wood or molded members but are cheaper and easier to mass-produce than conventional molded members; and, extruded members can be easily formed with internal reinforcing ribs or webs to add strength and stiffness. As such, the hollow extruded members offer a long lasting, low maintenance, and cost effective alternative for traditional wood floor members, such as on decks, floors, porches, marine docks and similar applications.

Because nails or screws driven directly through the plastic are likely to cause stress risers and/or cracking, the hollow extruded members require special mounting brackets or cleats in order to secure the members to the supporting frame or structure.

On certain polyvinyl decking systems, the decking members have a series of openings in the bottom surface, and the members are snapped onto mounting brackets or clips that have been attached to the top of the joist or support structure. Anther prior art approach utilizes U-shaped mounting clips that are attached to the top of the joist. The decking members are secured to the upwardly extending legs of the mounting clip. Such prior art systems have a number of drawbacks, including relatively high material costs and relatively long installation time, and on many such systems it is difficult to properly align the holes in the deck members with the preinstalled clips. Moreover, if the pre-installed clips are not mounted properly the decking members may move or "wander" slightly, giving the deck an unsightly and unprofessional appearance.

According to one prior art plastic decking plank, separate cap and base elements are snapped together to form a single plank. The base element is first mounted directly to the subfloor with fasteners such as screws or nails. Mating components of the cap and base elements are then manually aligned, and a rubber hammer or other tool is used to snap-attach the pieces together. Unlike the invention, such two-piece designs generally require substantial time and effort to assemble.

Another drawback with prior art methods is that polyvinyl, like all construction materials, flexes slightly under load. On conventional wood decks such flexing is almost completely unnoticeable. However, on plastic or polyvinyl decks such flexing often creates an unnerving and unpleasant squeak or creaking sound. For many reasons, most consumers consider such speaking and creaking a very undesirable attribute. Accordingly, there exists a need for an improved polyvinyl decking system that is cost effective to produce and install, and that does not have any of the unfavorable characteristics that plague prior art polyvinyl decking systems. Further, known polyvinyl decking has a tendency to deform along reinforcement lines, thus creating unsightly rows along the plank.

The present invention utilizes extruded tubular decking members that have internal reinforcing webs to maximize flexural strength and stiffness. The present invention also utilizes a unique interlocking feature between adjacent decking members and maintains the proper spacing between deck members and also secures the deck members to each other and to the supporting joists.

SUMMARY OF THE INVENTION

Accordingly, it is an object of this invention to provide an improved polyvinyl or plastic deck system.

It is another object of this invention to provide a polyvinyl or plastic deck that can be installed faster and more efficiently than prior art decks.

A further object of this invention is to provide a polyvinyl or plastic deck that eliminates binding or buckling caused by unequal thermal expansion.

A still further object of this invention is to provide a polyvinyl or plastic deck that does not squeak.

It is an object of the invention to provide a modular, one-piece plastic construction element which may be readily assembled together with a number of like elements to form a decking or other structure.

It is another object of the invention to provide a modular decking plank that is relatively inexpensive to manufacture.

It is another object of the invention to provide a decking plank which includes hidden fasteners located below the top surface of the decking structure for mounting the plank to a supporting subassembly.

These and other objects of the invention will become apparent to those skilled in the art upon a reading of the following description, with reference to the accompanying drawings.

BRIEF DESCRIPTION OF THE DRAWINGS

The system embodying the present invention is depicted in the accompanying drawings that form a portion of the invention and wherein.

DESCRIPTION OF THE PREFERRED EMBODIMENTS

Figure 1:
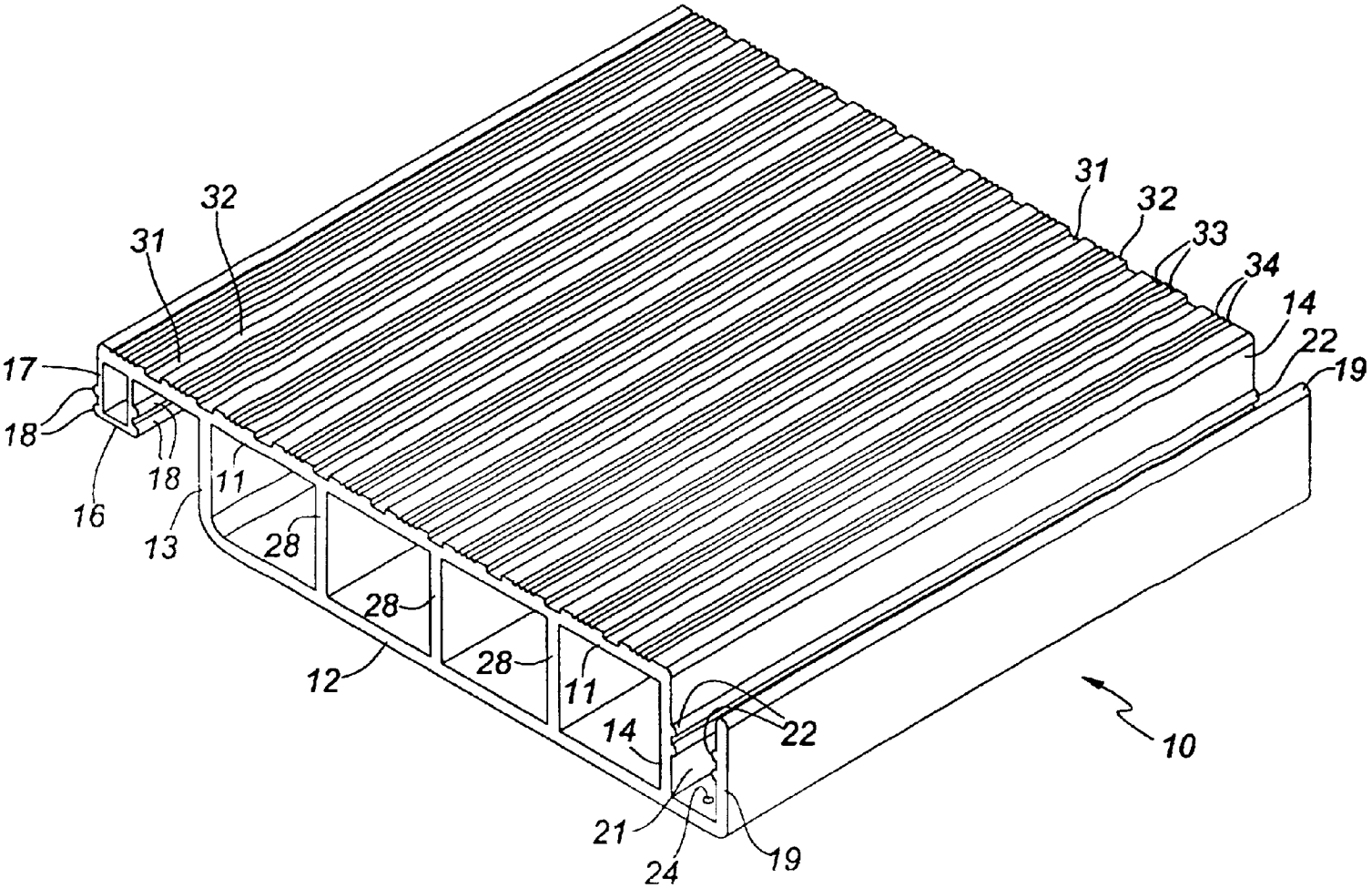
FIG. 1 is a perspective view of a deck plank made in accordance with the present invention.

Referring to the drawings for a clearer understanding of the invention it may be seen in FIG. 1, that the invention contemplates an elongated extruded construction element 10 having a top wall portion 11, a bottom wall portion 12, a first side wall 13 connecting the top and bottom, a second side wall 14 connecting the top and bottom. The element 10 is preferentially extruded from PVC or some other suitable plastic; however, aluminum extrusion of the plank is also possible.

Figure 2:
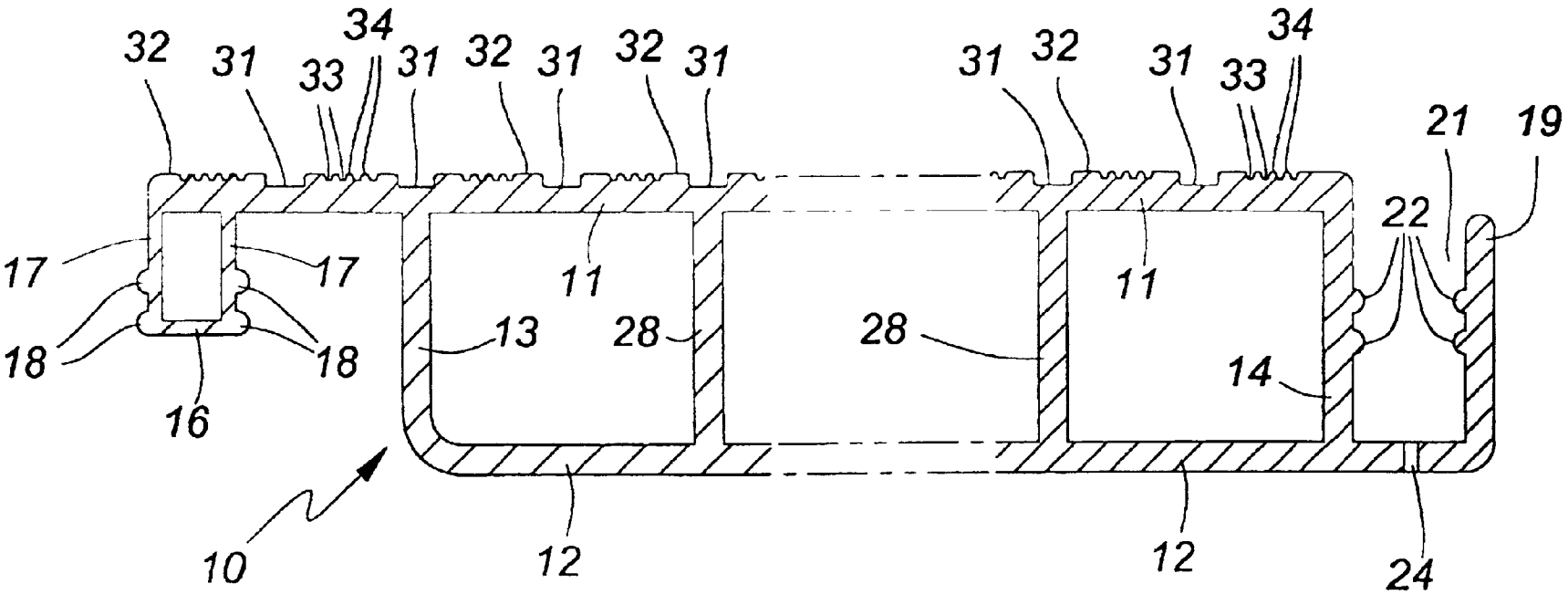
FIG. 2 is a partial section view of FIG. 1.
Figure 3:
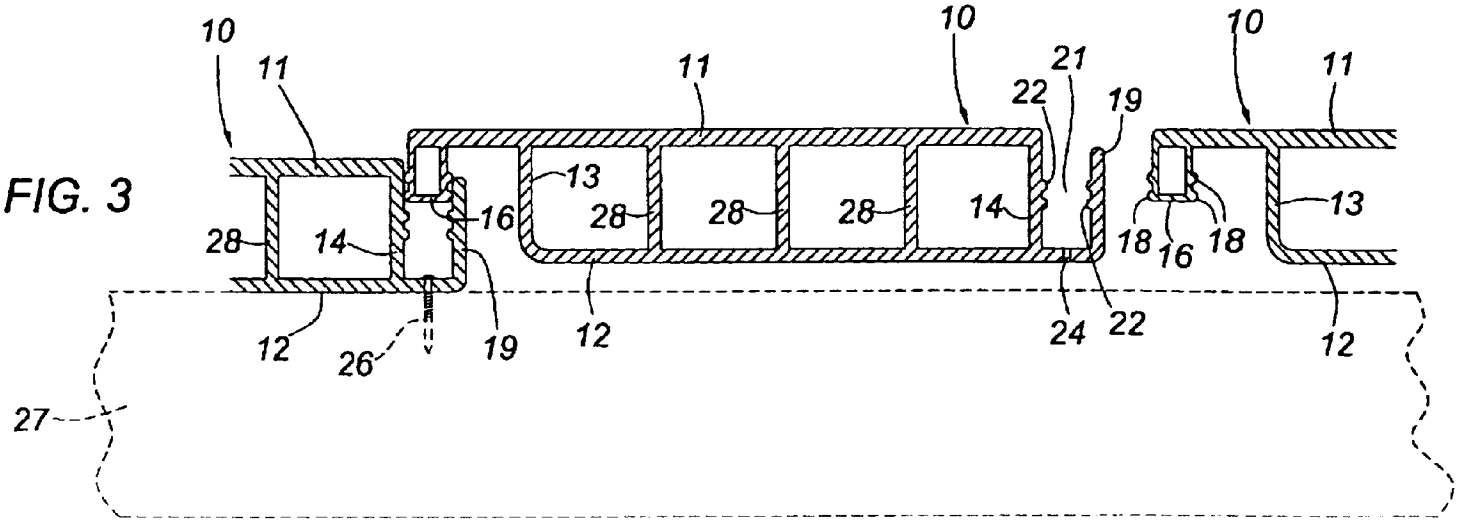
FIG. 3 is a sectional view of a plurality of planks being installed.
Figure 4:
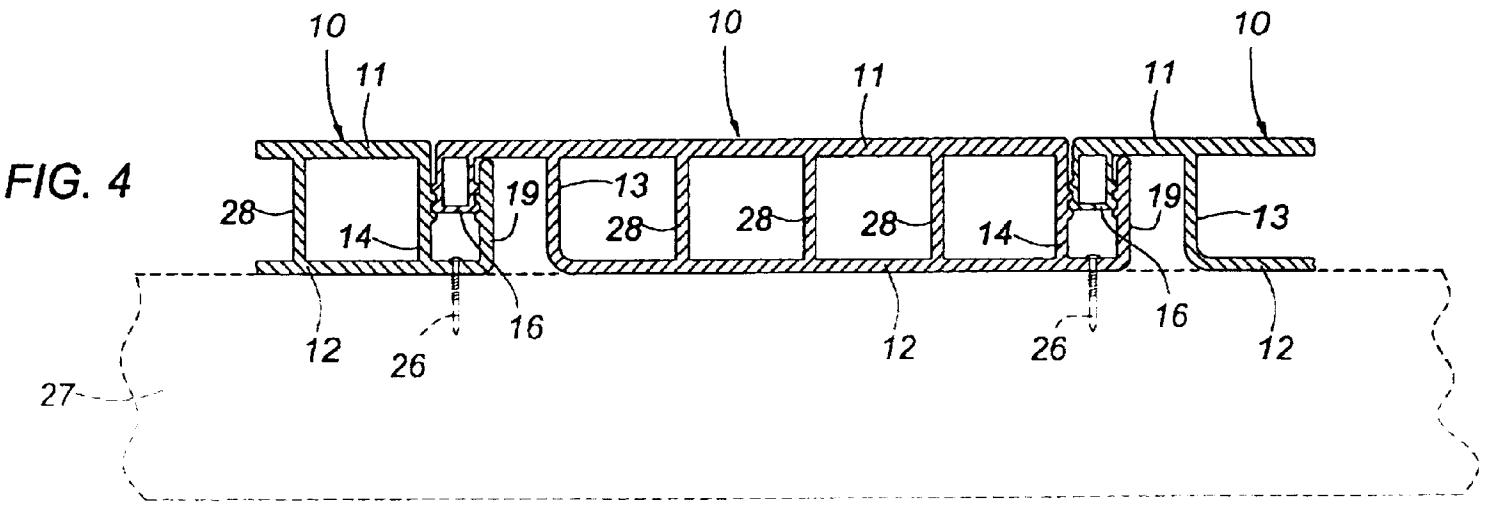
FIG. 4 is a sectional view of the installed planks.

Top wall portion 11 extends laterally past first side wall 13 and terminates in a downwardly extending flange 16 which includes a pair of flange walls 17 on which a set of longitudinally extending ribs 18 are formed in spaced relation to one another. Bottom wall portion 12 extends laterally past second side wall 14 and terminates in an upstanding longitudinal wall 19 that forms an upwardly opening channel 21. Formed on second side wall 14 and upstanding longitudinal wall 19 within channel 20 are complementary elongated ribs 22. As may be seen in FIGS. 3 and 4 the ribs carried by the flange and the channel mate to form a watertight seal between adjacent plank elements. As may be seen in FIG. 2, a series of apertures 24 is formed in bottom wall 12 within the channel 21 to permit the use of fasteners such as screws 26 to engage the subassembly 27 beneath the plans which may be a frame with joists or a subjacent surface.

To provide an attractive and functional upper surface, the top wall portion 11 of each plank is extruded with a series of longitudinal lands and crests, including a plurality of parallel major lands 31 separated by major crests 32. Formed on the top of major crests 32 are a series of minor lands 33 and minor crests 34, shown as the three lands and three crests in the preferred embodiment. Laterally of the minor lands and adjacent the major lands the major crests are flat or planar. This tread pattern disguises the stress pattern caused by a plurality of longitudinally extending internal walls 28 by placing the major lands directly over the internal walls and first end wall 13. The walls are about 0.120 inches wide whereas the major lands are about 0.159 inches wide. From crest to root of the adjacent minor lands and crests is 0.030 inches, with the major lands measuring 0.6075 from center to center. Internal walls are spaced 1.215 inches apart and the width of the plank is 5.95 inches. The crests and lands provide excellent drainage, traction and appearance for the polyvinyl deck.

It is to be understood that the form of the invention shown is a preferred embodiment thereof and that various changes and modifications may be made therein without departing from the spirit of the invention or scope as defined in the following claims.

What I claim is:

1. A decking system for placement on a subassembly, the subassembly having at least two spaced apart joists, said system comprising:

(a) a plurality of elongated tubular elements for placement in lateral interlocking engagement with each other transversely of and spanning the distance between the joists;

(b) each of said plurality of elements having a top portion, a bottom portion, and first and second side walls connecting said top and bottom portions;

[(d)] (*c*) wherein said top portion extends laterally beyond said first side wall and has formed thereon a downwardly extending longitudinal flange, and wherein said bottom portion extends laterally beyond said second side wall and has formed thereon an upwardly extending longitudinal wall defining an upwardly opening channel adjacent said second side wall adapted to receive therein in watertight relation said downwardly extending longitudinal flange, said bottom portion having formed therein a plurality of apertures [intermediate said second side wall and] *proximate* said upwardly extending longitudinal wall, adapted for the insertion of fasteners there through for engagement with said joists further comprising at least one internal wall extending between said top and bottom portion; and,

[(e)] (*d*) a surface tread formed on the exterior of said top portion comprising a series of longitudinally extending lands and crests including parallel major and minor lands *and crests*, said major lands overlying at least said first side wall and said at least one internal wall and separated by major crests, said major [crest] *crests* having formed thereon said minor crests and minor lands.

2. A decking system for placement on a subassembly, the subassembly having at least two spaced apart joists, said system comprising:

(a) a plurality of elongated tubular elements for placement in lateral interlocking engagement with each other transversely of and spanning the distance between the joists;

(b) each of said plurality of elements having a top portion, a bottom portion, and first and second side walls connecting said top and bottom portions;

(c) wherein said top portion extends laterally beyond said first side wall and has formed thereon a downwardly extending longitudinal flange, and wherein said bottom portion extends laterally beyond said second side wall and has formed thereon an upwardly extending longitudinal wall defining an upwardly opening channel adjacent said second side wall adapted to receive therein in watertight relation said downwardly extending longitudinal flange, said bottom portion having formed therein a plurality of apertures [intermediate said second side wall and] *proximate* said upwardly extending longitudinal wall, adapted for the insertion of fasteners there through for engagement with said joists and wherein said flange is defined by elongated opposing flange walls each of said flange walls having a pair of spaced apart longitudinally extending ribs and wherein said second side wall and said longitudinal wall have a pair of cooperatively spaced apart longitudinally extending ribs adapted to engage said flange wall ribs an form a moisture seal there along.

3. A decking system as defined in claim 2 further comprising at least one internal wall extending between said top and bottom portion.

4. A decking system as defined in claim 3 further comprising a surface tread formed on the exterior of said top portion comprising a series of longitudinally extending lands and crests including parallel major and minor lands, said major lands overlying at least said first side wall and each internal wall and separated by major crests, said major crest having formed thereon said minor crests and minor lands.

5. A decking system as defined in claim 4 wherein said major crests include a pair of longitudinally extending planar surfaces intermediate said major land and an adjacent minor land.

6. A decking system as defined in claim 5 wherein each of said plurality of elongated members is formed by extrusion from a material selected from the group including PVC, poly-ethylene-teriphathlate, and aluminum.

7. A construction element according to claim 2 including a plurality of spaced-apart holes formed in said fastening portion of said channel for accommodating passage of fasteners therethrough to a supporting structure.

8. A construction element according to claim 2 including a plurality of reinforcing ribs located between said side walls and interconnecting said top and bottom walls.

9. A structure comprising a plurality of interconnected modular construction elements according to claim 2 assembled together on a supporting structure.

10. A decking system for placement on a subassembly, the subassembly having at least two spaced apart joists, said system comprising:

a plurality of elongated tubular elements for placement in lateral interlocking engagement with each other transversely of and spanning the distance between the joists;

(b) each of said plurality of elements having a top portion, a bottom portion, and first and second side walls connecting said top and bottom portions;

(c) wherein said top portion extends laterally beyond said first side wall and has formed thereon a downwardly extending longitudinal flange, and wherein said bottom portion extends laterally beyond said second side wall and has formed thereon an upwardly extending longitudinal wall defining an upwardly opening channel adjacent said second side wall adapted to receive therein in watertight relation said downwardly extending longitudinal flange, said bottom portion having formed therein a plurality of apertures [intermediate said second side wall and] *proximate* said upwardly extending longitudinal wall, adapted for the insertion of fasteners there through for engagement with said joists; and, (d) a surface tread formed on the exterior of said top portion comprising a series of longitudinally extending lands and crests including parallel major and minor lands *and crests*, said major lands overlying at least said first side wall and separated by major crests, said major [crest] *crests* having formed thereon said minor crests and minor lands.

* * * * *